United States Patent [19]

Mérai

[11] Patent Number: 5,160,440
[45] Date of Patent: Nov. 3, 1992

[54] PROCEDURE FOR THE DEWATERING OF SEWAGE SLUDGE AND PLANT FOR PROCEDURE EXECUTION

[76] Inventor: Josef Mérai, Sulzbachtalstr. 38, 6603 Sulzbach, Fed. Rep. of Germany

[21] Appl. No.: 391,532
[22] PCT Filed: Oct. 29, 1987
[86] PCT No.: PCT/EP87/00641
    § 371 Date: Apr. 13, 1990
    § 102(e) Date: Apr. 13, 1990
[87] PCT Pub. No.: WO88/03048
    PCT Pub. Date: May 5, 1988

[30] Foreign Application Priority Data

Oct. 29, 1986 [DE] Fed. Rep. of Germany ....... 3636727

[51] Int. Cl.$^5$ .............................................. C02F 11/14
[52] U.S. Cl. ........................................ 210/710; 34/12;
        34/14; 34/69; 34/70; 100/71; 210/770;
        210/783; 210/202; 210/257.1; 210/262;
        210/297; 210/400
[58] Field of Search ............... 210/609, 710, 768–770,
        210/783, 202, 206, 262, 297, 400, 401, 257.1;
        34/12, 14, 69, 70; 100/118–120, 151, 152, 71,
        111

[56] References Cited

U.S. PATENT DOCUMENTS

| | | | |
|---|---|---|---|
| 4,153,550 | 5/1979 | Lautrette | 210/401 |
| 4,158,627 | 6/1979 | Ingemarsson | 210/400 |
| 4,192,743 | 3/1980 | Bastgen et al. | 210/712 |
| 4,341,628 | 7/1982 | Fujinami et al. | 210/401 |
| 4,358,381 | 11/1982 | Takeuchi et al. | 210/769 |
| 4,491,521 | 1/1985 | Wenske et al. | 210/401 |
| 4,587,022 | 5/1986 | Shimizu et al. | 210/710 |
| 4,761,895 | 8/1988 | Uyama et al. | 210/400 |

Primary Examiner—Peter Hruskoci
Attorney, Agent, or Firm—Fleit, Jacobson, Cohn, Price, Holman & Stern

[57] ABSTRACT

Procedure for dewatering sewage sludge comprising the steps of subjecting pumpable sludge to chemical pretreatment with addition of a flocculation agent, pre-dewatering the chemically pretreated sludge by gravity filtration and conveying the pre-dewatered sludge by gravity, dewatering the pre-dewatered sludge by pressure filtration to form a sludge cake, crumbling the sludge cake to obtain sludge cake pieces, and drying the sludge cake pieces. After the dewatering step, so hard sludge cake is formed that after crumbling the sludge cake pieces are obtained which maintain their shape in accumulated consistency. A plant for the execution of the procedure is disclosed. The plant comprises a chemical pretreatment station having a receptacle for an addition agent, a dosing pump for filling the addition agent into a sludge pipe provided with a mixer, a pre-dewatering station having at least two pre-dehydration belts superposed in different layers, connected in zigzag series having shells for the reception of water, a sludge silo below the pre-dewatering station in which the sludge is conveyed by gravity, a press station arranged below the sludge silo having at least one filter press which may be loaded with pre-dehydrated sludge from the top, a crushing unit for the crumbling of the hard sludge cake to obtain sludge cake pieces with great surfaces, and a post-dewatering station consisting of drying belts.

5 Claims, 1 Drawing Sheet

PROCEDURE FOR THE DEWATERING OF SEWAGE SLUDGE AND PLANT FOR PROCEDURE EXECUTION

BACKGROUND OF THE INVENTION

1. Field of the Invention

The invention concerns a procedure for dewatering of sewage sludge, whereby the pumpable sludge and the sludge made pumpable by breaking up solid substances is subjected to chemical pretreatment with addition of flocculation agents; thereafter the sludge is dewatered to form a sludge cake by pressing; said sludge cake is then destined for further utilization or final storage.

The procedure according to the present invention is also directed to raw sludges and digested sludges of local sewage purification plants as well as to industrial sewages.

2. Description of the Prior Art

The present invention starts from the process for dewatering of sewage sludge as described in DE-OS 28 38 899 in which the crumbled and chemically pretreated sludge is directly led to an extractor press, in which it is conveyed by a screw from the bottom to the top, with other words: in which the sludge is pumped up. A chemical pretreatment of the sludge, particularly with flocculants, however, is impaired in its effect if the sludge cake treated in this manner is exposed to pumpage.

On principle, the main aim of the previously described sludge dewatering procedure is to reduce as far as possible the volume of the sludge to economize the volume of deposit as well as the transport and depositing costs and to give the sludge the highest possible shearing resistance in order to guarantee a long time of depositing capability. The best dehydrating units, i.e. the chamber filter presses, actually reach only 32-35% of (dry substance at maximum). It results a relatively high remaining humidity which causes many problems for the depositing capability. Therefore, the development tends to burn the sewage sludge with addition of primary energy, i.e. to destroy the sludge.

However, the sewage sludge is a precious substance and it should not simply be thrown away on dumping places or destroyed, and this with the addition of primary energy.

SUMMARY OF THE INVENTION

It is accordingly the object of the present invention to provide a procedure and a plant with which it will be possible to achieve such high dryness degrees of the sludge that the produced sludge cake may be utilized as source of energy for incineration, for pyrolysis, oil production or as drilling fertilizer.

The solution of this problem represents a procedure, in which the chemically pretreated sludge is subjected to pre-dewatering under conveyance without pumping, and is dewatered by the pressure filtration in a way to form such a hard cake that after breaking up this cake, pieces will be obtained which—with accumulated consistency—maintain their shape, and that the pieces of sludge cake will be post-dewatered e.g., when they are conveyed on drying belts. This solution is based on the knowledge that elimination of water of a sludge quantity is subject to physical laws which however, are different in the various dehydration phases. Therefore, the chemically pretreated sludge is first subjected to pre-dewatering with conveying without pumping, i.e. only by gravity, to obtain dry substance of about 20% (all references to percentages refer to weight percent). Conveying without pumping is very important to avoid destruction of the flakes which have been formed with addition of flocculation agent, so that the sludge may be led to the press in a consistency which allows dehydration up to 50% dry substance.

Dehydration with mechanical pressing is to be carried out in a way that after breaking up the hard sludge cake pieces will be obtained which—when they are accumulated—resist by their nondeformability to a third phase, namely the post-dewatering or drying on drying belts. The pieces of sludge cake should be so hard, as they cannot disintegrate into lumps. Entrance of air into the sludge cake pieces is guaranteed, independently from their accumulation on the drying belts, so that a post-dewatering or post-drying up to approximately 90 to 95% may be achieved.

The high dewatering rate of approximately 50% dry substance by mechanical pressing is obtained within a reasonable short period of time, if formaldehyde is used as a conditioning agent in the chemical pretreatment, as has been described in European Patent Application No. 85901537, The execution of the procedure is effected in a plant consisting of:

a) a station for the chemical pretreatment having a receptacle for an addition agent, a dosing pump for filling the addition agent into a sludge pipe provided with mixer, b) a pre-dewatering station having at least two pre-dehydration belts superposed in different layers, connected in zigzag series having shells for the reception of water and washing stations for the empty belt of each conveyer, c) a sludge silo below the pre-dewatering station in which the sludge is conveyed by gravity d) a press station arranged below the sludge silo with at least one filter press which may be loaded with pre-dehydrated sludge from the top, e) a crushing unit for the crumbling of the hard sludge cake with a pelletizer or similar to obtain sludge pieces with great surfaces, and f) a post-dewatering station, preferably with a variety of drying belts superposed in different layers and connected in zigzag series.

Besides transport without pumping of the sludge pre-dehydrated by gravity to the press station it must be pointed out that at least one press—in case of larger quantities of sludge also several presses being alternatively loaded—may be loaded from the top, i.e. not by the intermediary of a sludge pump. A dehydration unit according to DE-OS 28 4 716 with increasing pressure without feeding pump could be utilized.

Taking into consideration that the mechanical press must be charged by gravity only from the top with pre-dewatered sludge, a press station in which the sludge silo is combined with a filter press with a flexible rubber membrane is recommended, as indicated in patent claims 5 and 6 and described in detail in the drawing explanation.

The crumbling of the sludge cake for instance with a pelletizer is advisable to obtain the sludge cake pieces with large surfaces. In due course, with the conduction of the procedure, especially with pressing to about 50% dry substance and the resulting nondeformability of the pieces, the installation of a post-dewatering station with a corresponding number of drying belt layers becomes suitable; thus, this invention presents the possibility to eliminate the residual water up to 90 to 95% dry substance by means of vaporization. Several groups of superposed drying belts may also be connected in series, whereby it is recommended to cover the post-dewatering station during the cold season similar to a greenhouse and to heat it, whereby part of the obtained dry substance may be used as source of energy.

DESCRIPTION OF THE PREFERRED EMBODIMENT

Figure 1:
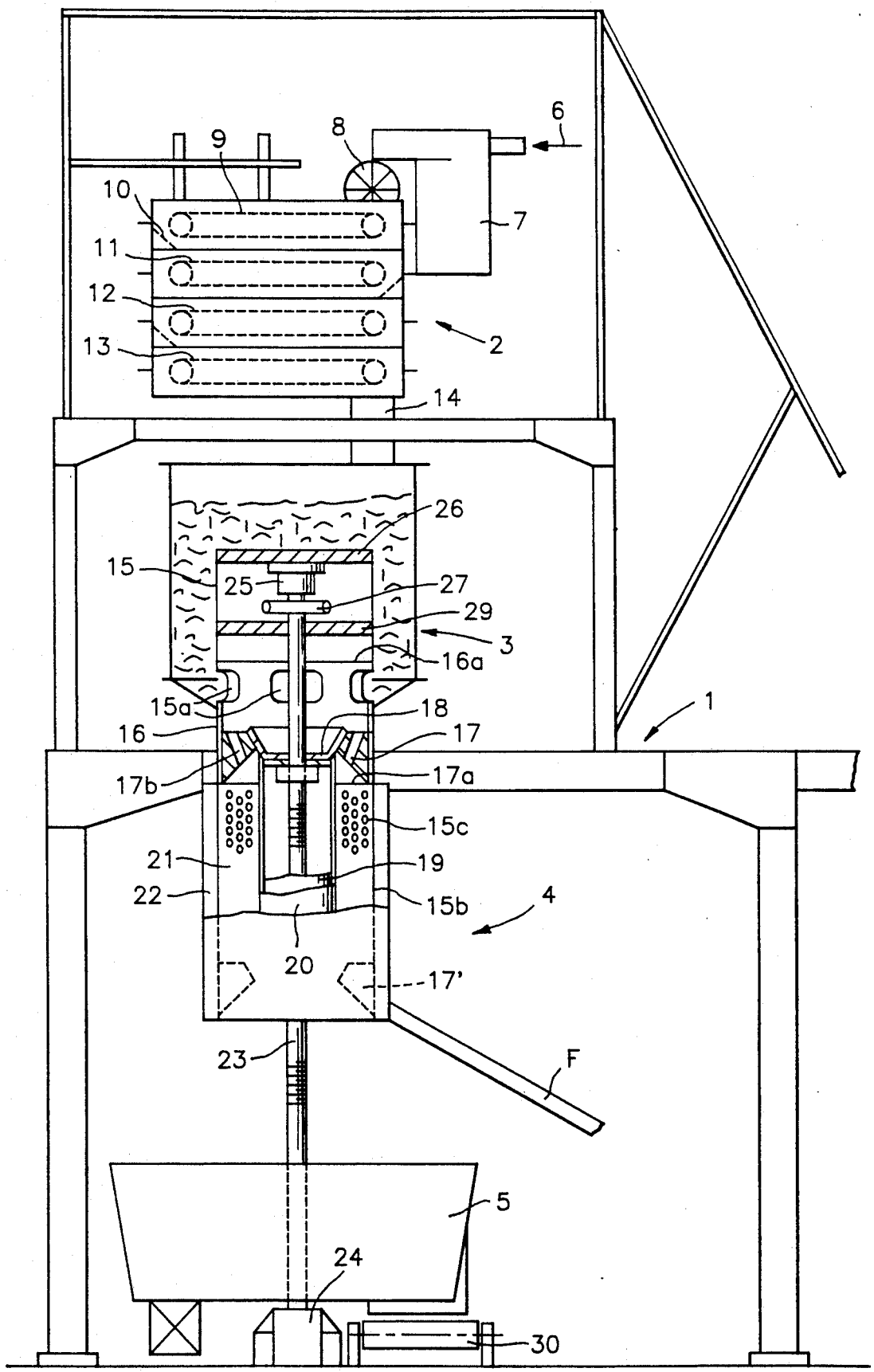
FIG. 1 is a vertical sectional view of the preferred embodiment of a sludge dewatering plant according to the invention.

One recognizes a skeleton construction 1 with several layers for the reception of the pre-dewatering station 2 in the upper layer, the sludge silo 3 with integrated filter press 4 in the medium layer and a crushing machine 5 on the bottom. The equipment of the chemical pretreatment of sludge as well as the drying belts for post-dewatering of the sludge cake pieces leaving the crushing machine 5 is not represented.

The sludge to be dewatered is led in arrow direction 6 into a conditioner 7, in which the chemically pretreated sludge is maintained in movement. In the supply, which is not represented, for the chemically pretreated and blended sludge with flocculation agent, there is the last pump before or upstream the mixers in which the sludge is blended with the flocculation agent. From the conditioner 7 the sludge passes over (by overflow) to a rotating gear wheel 8 which continuously deposes the sludge on an upper pre-dewatering belt 9, which conveys from the right to the left. The conveyer 9 is carried out as screen belt, so that a great quantity of water is already extracted during transport of the sludge. The sludge removed from the pre-dewatering belt 9 is led by inclination over a slide 10 to another deeperly arranged pre-dewatering belt 11. A total of four superposed connected in zigzag series pre-dewatering belts 9, 11 to 13 is provided for, which is provided with shells for the collection of water. The washing plants for the empty belts of each conveyer are not represented.

The sludge leaving the pre-dewatering station 2 is pre-dehydrated up to 20% dry substance and is led over a gravity tube 14 to the sludge silo 3. In this silo, there is a firmly fixed outer cylinder 15, closed at the top and provided with circumferentially positioned perforations 15a near the bottom of the silo; it largely extends outside the silo 3 and, as it will be seen lateron, it constitutes in its lower part filter press 4. The circumferentially distributed openings 15a of the fixed outer cylinder 15 within the sludge silo 3 may optionally be covered or opened by a vertically adjustable cylinder 16 which is situated inside the outer cylinder 15. In the shown position of the adjustable cylinder 16, the openings 15a correspond with corresponding openings of the adjustable cylinder 16 so that the predewatered sludge may penetrate in arrow direction into the inside of adjustable cylinder 16 which is closed at its upper edge 16a. In a not represented, elevated position of the adjustable cylinder 16 the openings 15a are closed.

The vertically adjustable cylinder 16 also belongs to the filter press 4, just as the fixed outer cylinder 15. The adjustable cylinder 16, practically acting like a servo valve spool, is connected at its lower part by means of two concentric flush rings 17, 18 to a closed inner cylinder 19 of smaller diameter. This inner cylinder is enclosed in an inflatable rubber tube 20 as a rubber diaphragm which is fixed at its both ends between pairs of concentric flush rings 17, 18. The lower pair of concentric flush rings 17, 18, which cannot be seen and which are fixed with each other, are—in contrast to the upper pair—exclusively supported by the closed inner cylinder 19 and are firmly anchored to it, since the adjustable cylinder 16 only comes up to the lower edge 17a of the outer flush ring 17 having a wedgelike diameter.

As already mentioned, the fixed outer cylinder 16 reaches far out of the sludge silo 3 and is provided in its lower part 15b with openings 15c. The cylinder area 15b represents the perforated sheet metal shell of the filter press 4, which constitutes between itself and the rubber diaphragm 20 the circular filter chamber 21. At the exterior side, the perforated area 15b is encircled by an annular chamber 22 for the reception of the filtrate, which is evacuated over the schematically indicated conduit F.

The upper outer flush ring 17 is provided with circumferentially positioned bores 17b via which the filter chamber 21 communicates with the closed inner part of cylinder 16.

A central screwed spindle 23, which is led through the crushing machine 5 and supported at the bottom by a thrust bearing 24 is provided for the elevation adjustment of the cylinder 16 with its flush rings 17, 18, its inner cylinder 19 and the rubber diaphragm 20. At the top edge the screwed spindle 23 is supported in a bearing sleeve 25 at the cover 26 of the fixed outer cylinder 15. Over a worm wheel 27 the screwed spindle 23 is pivotally operated by a non represented motor, which is arranged inside the fixed outer cylinder 15. The upper inner flush ring 18, which is connected with the adjustable cylinder 16 as well as with the inner cylinder 19 with rubber diaphragm 20, is connected with a fixed nut 28, so that a rotation of the screwed spindle 23 affects the elevation adjustment of the inner part of the filter press with the parts 16 to 20.

In the crushing machine 5, the cake dropping from filter press 4 is being crumbled and deposited in pieces onto the conveyer belt 30 which leads to the non represented pelletizer and further to the post-dewatering station in the open air.

The mechanism of the sludge dewatering plant as described is as follows:

The sludge to be dewatered and which contains about 5 to 6% of dry substance, is dewatered on screen belts 9, 11 to 13 within the pre-dewatering station 2 to about 20% of dry substance and is continuously conveyed into sludge silo 3. In the represented position of the adjustable cylinder 16, the filter chamber 21 is filled in that the sludge penetrates through the controlled openings 15a into the inside of the adjustable cylinder 16 and then further through the circumferentially distributed bores 17b into the filter chamber 21. In order to overcome the flow resistance, the construction height of sludge silo 3 as well as the filling level of the fed sludge must not be too low, so that within the region of the overflow openings a certain static liquid pressure exists.

After the filter chamber 21 has been closed, which chamber is closed up against the fixed outer cylinder 15 or its perforations 15a, respectively, by means of a pair of flush rings 18, 17, the rubber tube 20 is internally pressurized with air so that it extends and presses the sludge against perforated jacket 15b. The filtrate entering the annular chamber 22 is discharged via conduit F. It goes without saying that the filter chamber 21 has to be sealed against the inner of sludge silo 3 during the pressing operation. In order to achieve this, the adjustable cylinder 16 is moved upwardly and downwardly so that its circumferentially distributed openings do no longer correspond to those openings 15a of the fixed outer cylinder 15.

After termination of the pressing operation, the inner part of the round filter-press 4 with members 16 to 20 is moved downwardly by rotating of the screwed spindle 23 in such a way that the upper flush ring 17 becomes situated in position 17'—represented in broken lines—at the lower end of the fixed outer cylinder 15. In this connection, the strip edge 17a of the upper flush ring 17 serves to loosen the filter cake or sludge cake, respectively, which adheres to the inner side of perforated region 15b or to the superposed filter fabric, respectively. The sludge cake then drops down in pieces into crushing machine 5. Since, during this procedure, the adjustable cylinder 16 with its upper cover 16a is situated far below the openings 15a of the fixed outer cylinder 15, said openings are open. This means that sludge may enter above the cover 16a of the adjustable cylinder 16, however, it is forced back as soon as the adjustable cylinder 16 which is closed at the top is moved upwardly. In order to avoid that the upper inner part of the outer cylinder 15, which accomodates the motor for the screwed spindle 23, is overflown with sludge, the lower closure cover 29 is provided for. The adjustable cylinder 16 may also have a closed cylinder jacket and be separated from the upper flush ring 17 which then is not provided with bores 17b. In this embodiment, the adjustable press members 17 to 20 are to be moved upwardly, taking along the loose adjustable cylinder 16, so far that the openings 15a below the flush ring 17 directly communicate with the filter chamber 21. During pressing and stripping off the filter cake by the strip edge 17a, the cylinder 16 remains fixed by a stop in the position represented in the drawing, which position simultaneously is the lower height as well as the closed position.

I claim:

1. A plant for producing dewatered sludge cake comprising:
   a) a conditioner station for receiving chemically pretreated sludge and transporting said sludge to an upper pre-dehydration belt of a pre-dewatering station,
   b) a pre-dewatering station for receiving sludge from said conditioning station having at least two pre-dehydration belts superposed in different layers, connected in zigzag series and having at least one chute for discharging sludge from a higher belt to a lower belt,
   c) a sludge silo below the pre-dewatering station in which the pre-dehydrated sludge is conveyed by gravity,
   d) a press station arranged below the sludge silo having at least one filter press for producing a sludge cake from said predehydrated sludge, and
   e) a crushing unit arranged below said press station for receiving and crumbling of the sludge cake from said filter press.

2. The plant according to claim 1, wherein in the sludge silo there is a firmly fixed outer cylinder which is closed at the top and provided with circumferentially distributed openings near the bottom, in which outer cylinder a vertically adjustable cylinder to optionally cover or open the openings is placed.

3. The plant according to claim 2, wherein the fixed outer cylinder reaches outside the sludge silo and is provided in its lower section with perforations and enclosed by an annular chamber for the reception of the filtrate, that the adjustable cylinder is connected at its lower edge over two concentric flush rings with a closed inner cylinder of smaller diameter, which is encircled by an inflatable rubber tube, which is fixed at its both edges between pairs of concentric flush rings, that the annular filter chamber formed between the rubber tube and the perforated section of the fixed outer cylinder communicates with the inner part of the adjustable cylinder via bores in the outer upper flush ring, and that the upper flush ring is provided with a stripper edge for the loosening of the filtered cake sticking to the perforated section of the fixed outer cylinder.

4. The plant according to claim 3, wherein the adjustable cylinder, which is separated from the upper pair of flush rings and formed with a closed cylinder jacket, may, due to elevation of the adjustable press parts, directly be elevated from a closed position fixed by a stop in such a way that the openings of the fixed outer cylinder directly communicate with the filter chamber.

5. Process for the dehydration of waste water sludge, in which pumpable sludge, or sludge made pumpable by the pulverization of solid matter, is subjected to preliminary chemical treatment through the addition of flocculents and is dehydrated into sludge cakes by compression, the material then being removed for use or ultimate storage, comprising the steps of:
   a) in an initial operating step the chemically pretreated sludge is transported over at least two preliminary dehydration filter belts positioned one over the other in a zigzag path without the assistance of a pump and is thereby subjected to preliminary dehydration through the effect of natural gravitation, and the resulting sludge is repositioned from a higher belt to a lower belt by discharge through a chute, the preliminary dehydration of the sludge being continued by such repositioning until the sludge has achieved a dry matter content of at least 20%-weight;
   b) in a second operating step the pre-dehydrated sludge is fed by gravity through a sludge silo to a filter press in unpumped fashion and is there dehydrated under pressure sufficient to form a filter cake with about 50%-weight dry matter;
   c) in a third operating step the filter cake is broken up into pieces in a crushing unit arranged below said filter press;
   d) in a fourth operating step the pieces are fed onto drying belts of a second dehydration station and are dried by evaporating the water content to about 90 to 95%-weight dry matter.

* * * * *